Patented May 3, 1927.

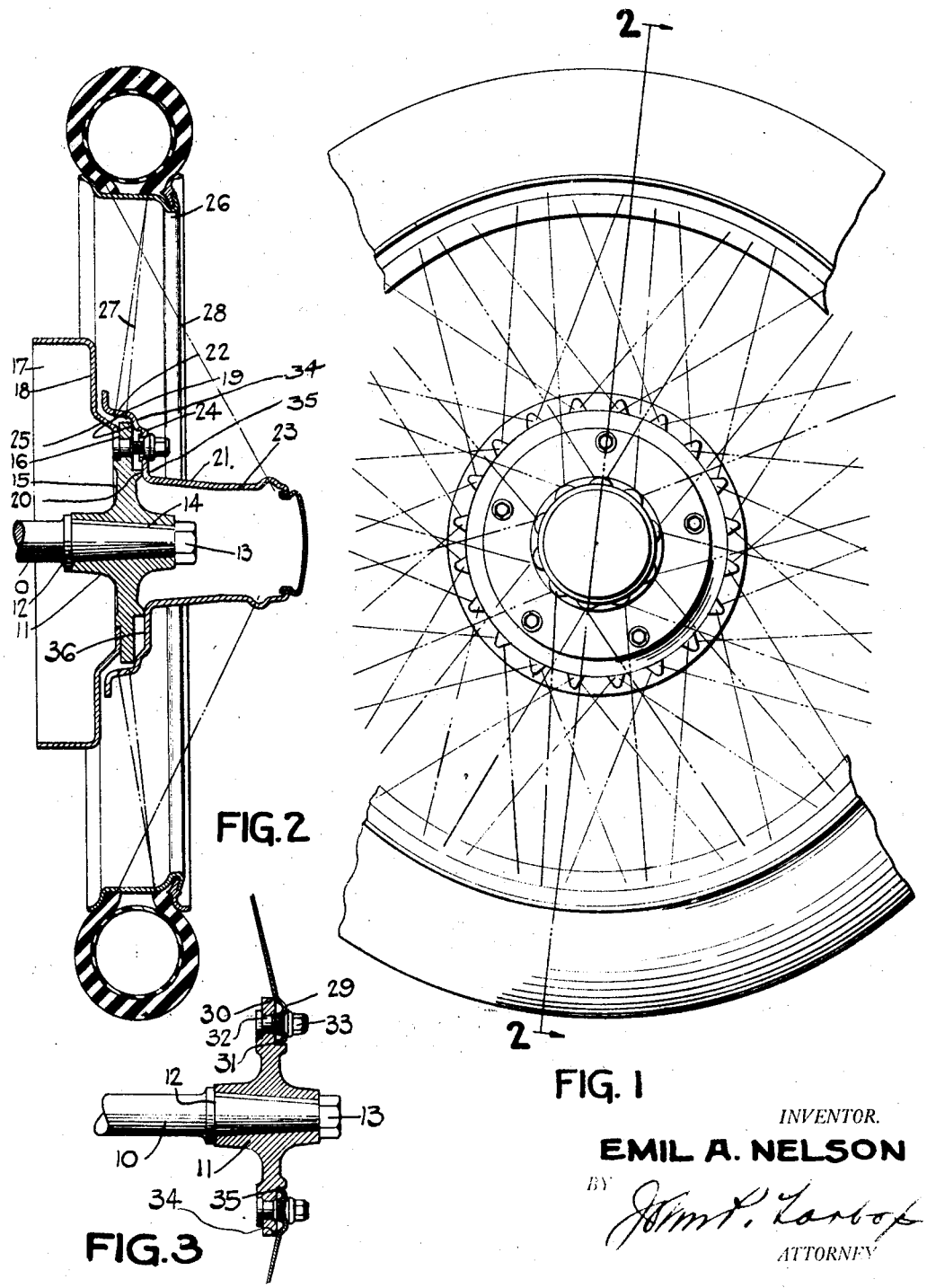

1,627,193

UNITED STATES PATENT OFFICE.

EMIL A. NELSON, OF ABINGTON, PENNSYLVANIA, ASSIGNOR TO BUDD WHEEL COMPANY, OF PHILADELPHIA, PENNSYLVANIA, A CORPORATION OF PENNSYLVANIA.

AUTOMOBILE WHEEL STRUCTURE.

Application filed January 29, 1925. Serial No. 5,418.

The type of wheel to which my invention pertains is the demountable wheel which has reached its highest perfection in the automobile field. It is the alternative of the demountable rim or tire type of wheel. Instead of changing tires by demounting the tire or demounting the tire and the rim of a supplemental rim, the entire wheel body is demounted. The demountable wheel has the advantage of enabling one to make a quicker and easier change in case of tire disablement and the superimposed advantage of providing a spare wheel body in case of damage to the wheel structure rather than the tire.

The principal aim of my invention is a practical structure enabling wire and disc wheels or combinations of the same, both of the demountable type, to be used interchangeably. Heretofore, the wheel mounting structures for disc wheels have been quite different from those for the wire wheels. According to my invention, I achieve a structure in which the same mounting is used for each.

Wire wheel hub structures, in particular, have heretofore been rather complicated and expensive. This complication stood in the way of the achievement of my invention. The simplification of this structure constitutes an important part of my invention. Through it, no less than by the other means which I have employed, I have reduced the cost of manufacture, reduced the gross weight of the structure at large and at the same time, by reason of the directness of the relations effected between the parts which make possible wholly correct mechanical relations, I have increased the strength.

Still further, the combination of parts evolved in my invention is such that I am enabled to make use of securing means for the wheel, held fast by the action of the driving torque upon it, and automatically self-tightening whenever there is any tendency whatever to loosen.

In the accompanying drawings, I show one embodiment of my invention. Of them,

Fig. 1 is an outside elevation of a wire wheel structure with portions broken away right and left for the purpose of saving space in illustration;

Fig. 2 is a central vertical section of this structure taken on the line 2—2 of Fig. 1, looking in the direction of the arrows, and Fig. 3 is a portion of a central vertical section showing the mounting of a disc wheel.

The organization is illustrated in connection with the driving wheel of a vehicle rather than a steering wheel but the invention applies to driving and steering wheels alike.

The driving axle (which might by the provision of suitable bearings illustrate the steering axle) is designated 10. On this driving axle is mounted an inner hub 11. As shown, it is secured thereon against shoulder 12 by a nut 13. Its barrel is tapered complementally to the tapering end of the shaft 10 which in this case being a driving shaft, is provided with a key 14.

The hub 11 is provided with a radially extending mounting flange 15 which carries the other parts of the structure. On its inner face, it is provided with a bearing surface or seat 16 to which is secured the brake drum 17 by means of its hub 18. Its outer face is provided with stepped bearing surfaces or seats 19 and 20 respectively, which carry the outer hub structure 21.

The outer hub structure is of elongated form and comprises inner and outer portions 22 and 23 of different diameters interconnected by an intermediate radially extending portion 24. The inner portion is of a greater diameter and is arranged to overhang both the exterior of the bearing flange 15 of the inner hub 11 and the offset 25 of the head 18 of the brake drum. The head of the brake drum is offset as a matter of fact to accommodate this overhang. The rim 26 is supported from the outer hub 21 by two sets of supporting means such as spokes 27 and 28. The one 27 is anchored to the hub 21 in the zone of the overhang portion 22 of larger diameter, the zone of anchorage lying inwardly of the bearing flange 15. The other set of supporting means 28 is anchored on the opposite side of the bearing flange 15 in a zone which lies at or near the opposite end 23 of the hub.

The radial bearing surface or seat 19 provided on the inner hub 11 is adapted to receive normally the disc of a disc wheel as shown in Fig. 3. This disc in a type of wheel known as the "Michelin" wheel is provided with an annular offset 29 in its central portion defining at the root 30 of the offset and the edge 31 of the inner flange of the offset annular bearing seats adapted to complementally engage the radial bearing surface 19 of the inner hub 11. Intermediate these seats is provided a row of coined holes through which pass axially extending securing bolts 32 arranged in annular series about the hub axis and within which are engaged nuts 33 on the heads of the bolts. These coined holes and nuts are formed with complemental tapering engaging surfaces, preferably spherical according to the Michelin invention, and characteristically are not only held fast by the driving torque but also are automatically self-tightening when made right handed on the right hand side of the vehicle and left handed on the left hand side of the vehicle.

In addition to the radial bearing surface 19, the bearing flange 15 carries a second radial bearing surface or seat 20, of less diameter than the surface 19 and axially displaced laterally outwardly therefrom. The radially interconnecting portion 24 of the outer hub 21 of the wire wheel structure which is to be inter-changed with the disc wheel structure is formed with engaging bearing surfaces or seats 34, 35 complemental respectively to the seating surfaces 19, 20, of the inner hub 11 as shown clearly in Fig. 2 and, therefore, in stepped relation with each other. Intermediate these inner hub bearing seats, the radially interconnecting portion is provided with an annular series of coined holes 36 of the same dimension as the holes in the disc wheel construction outlined in Fig. 3. The same studs and nuts which serve to fasten the disc therefore serve to fasten the outer hub 21 of the wire wheel construction. The same function secured in the case of the disc wheel construction is therefore secured in the case of the wire wheel construction. Thus the demountable disc and the demountable wire wheels may be used interchangeably upon the same inner hub 11.

My invention, it will be obvious, does not rest in the wire wheel per se, but in the construction of the inner hub, the outer hub, the brake drum and the inter-relation between the anchorages of the sets of rim supporting means, the inter-hub bearing seats, the inter-hub securing means, etc. Through these constructions and interrelations, I attain the objects of my invention, the interchangeability of the wire wheel with the disc wheel on the same hub, an inherent simplicity, a great strength and a low cost. The interchangeability speaks for itself. The formation of the outer hub is that of a simple drawn or die-stamped shell, in the main of cylindrical form, free from expensive irregularities of contour. It provides widely spaced zones of anchorage for the spokes, well balanced about the inter-hub bearing surfaces. This gives a strong wheel bracing. The radial and axially displaced stepped bearing surfaces 19, 20, 34 and 35, dispose the bearing surface both radially and axially in such a manner as to give breadth of seating, insuring rigidity of mounting and perfect alignment. These relations and the forms of the parts lend themselves most admirably to that augmentation of strength achieved more by form and inter-relation than by increase of mass. My invention applies the wire wheel to the disc wheel type of hub with the simplicity of the disc wheel itself.

There are many modifications of my invention possible. Some of them are known to me at present. Yet others will be developed later. All modifications falling within the purview of my inventive idea should fall within the scope of the appended claims.

What I claim is:

1. In a vehicle wheel, the combination of an inner hub, an outer hub, radially-spaced inter-hub seating surfaces arranged in zones displaced axially from each other, and means for securing said hubs together engaging said outer hub in the zone between said inter-hub seating surfaces.

2. In a vehicle wheel, the combination of an inner hub, an outer hub having axially spaced anchorage zones for two sets of rim supporting means, radially-spaced inter-hub seats in a zone intermediate the anchorage zones of said two sets of rim supporting means, and a plurality of axially extending means for securing said hubs together engaging the outer hub in the zone between said interhub seats.

3. In a vehicle wheel, the combination of an inner hub having a radial flange adapted to seat a wheel disc, an elongated wire wheel outer hub having an outwardly flared portion complemental to said radial flange, radially-spaced inter-hub seating surfaces on said flange and the outwardly flared portion of said wire wheel hub, and means engaging said outer hub in the zone between said inter-hub seating surfaces for clamping it to the inner hub.

4. In a vehicle wheel, the combination of an inner hub having a substantially radial bearing face, an elongated outer hub having a complemental bearing face engaging with the first and provided with anchorage zones for two sets of rim supporting means, one of said zones being adjacent said bearing face and the other at a substantial distance outwardly of said bearing face, and common means for centering and securing the outer hub to the inner hub with said complemental bearing faces in engagement.

5. In a vehicle wheel, the combination of an inner hub having a radial flange, an elongated outer hub having its inner end flared outwardly to form a radially extending portion, and an inwardly offset portion extending from said radially extending portion, said flange and inwardly offset portion being provided with complemental inter-hub bearing surfaces, and additional inter-hub bearing surfaces spaced from the first named bearing surfaces, and axially extending securing means engaging the outer hub in the zone between said bearing surfaces for clamping it to the inner hub.

In testimony whereof I hereunto affix my signature.

EMIL A. NELSON.